US005666136A

United States Patent [19]

Fujishita et al.

[11] Patent Number: 5,666,136
[45] Date of Patent: Sep. 9, 1997

[54] AUDIO EQUIPMENT AND METHOD OF DISPLAYING OPERATION THEREOF

[75] Inventors: Kaneaki Fujishita; Osamu Sakurai, both of Kanagawa; Junichi Nagahara, Tokyo, all of Japan

[73] Assignee: Sony Corporation, Tokyo, Japan

[21] Appl. No.: 287,531

[22] Filed: Aug. 8, 1994

Related U.S. Application Data

[62] Division of Ser. No. 107,681, filed as PCT/JP92/01645 Dec. 17, 1992, abandoned.

[30] Foreign Application Priority Data

| Dec. 17, 1991 | [JP] | Japan | 3-333668 |
| Dec. 18, 1991 | [JP] | Japan | 3-335147 |
| Dec. 19, 1991 | [JP] | Japan | 3-336950 |
| Dec. 19, 1991 | [JP] | Japan | 3-337215 |
| Dec. 19, 1991 | [JP] | Japan | 3-337231 |
| Dec. 20, 1991 | [JP] | Japan | 3-338714 |

[51] Int. Cl.⁶ ............................................. H03G 3/00
[52] U.S. Cl. ........................... 345/146; 381/1; 381/63
[58] Field of Search ...................... 345/35, 146, 204; 381/61, 63, 11, 1, 118–119, 18–24; 455/4.2, 6.2; 348/569, 563, 463, 355, 906, 473; 84/600, 622, 626, DIG. 1, DIG. 24

[56] References Cited

U.S. PATENT DOCUMENTS

| 4,876,719 | 10/1989 | Nakagami et al. | 381/1 |
| 5,027,687 | 7/1991 | Iwamatsu | 381/1 |
| 5,247,864 | 9/1993 | Konishi | 345/35 |
| 5,282,028 | 1/1994 | Johanson et al. | 455/4.2 |
| 5,321,846 | 6/1994 | Yokota et al. | 455/4.2 |
| 5,475,835 | 12/1995 | Hickey | 348/514 |

FOREIGN PATENT DOCUMENTS 0 390 041  3/1990  European Pat. Off. ............ 345/146

*Primary Examiner*—Richard Hjerpe
*Assistant Examiner*—Amare Mengistu
*Attorney, Agent, or Firm*—Jay H. Maioli

[57] ABSTRACT

The present invention is concerned with an audio equipment capable of processing video signals and a method of displaying operation of the acoustic equipment. An input selector switch 1 is supplied with reproduced audio signals from devices connected to a tuner unit 2 and input terminals 3, and supplies a signal to a sound field processing DSP unit 4. A signal processed by the DSP unit 4 is applied through a muting switch 5 to an output terminal 6. An input selector switch 7 is supplied with reproduced video signals from devices connected to input terminals 8, and supplies a signal to a graphic controller (GDC) 9 which generates a video signal to display an image. One of a signal generated by the GDC 9 and an original video signal are selected by a switch 10, and applied to an output terminal 11. The GDC 9 also generates an image simulating a control panel. When a key switch 13 is operated, the display corresponding to the operated key in the simulating image is varied.

2 Claims, 22 Drawing Sheets

FIG. 7A

```
TUNER
 CH    INIEX       FREQ         LINK      LINK ON
[A☐]  [News<]  [FM  90.00MHz]  [P7]        MONO CH    FREQ       LINK        CH    FREQ        LINK
 A1  FM  87.50MHz              B6  FM108.00MHz
 A2  FM  90.00MHz   U4  M      B7  AM    1000kHz
[A3  FM  90.00MHz   P7  M]     B8  AM     990kHz   P0
 A4  FM  90.00MHz   P5  M      B9  AM     990kHz   U9
 A5  FM 108.00MHz   P8         B0  AM     990kHz
 A6  AM    990kHz   P0         C1  FM   87.50MHz
 A7  AM   1000kHz              C2  FM  108.00MHz
 A8  AM   1000kHz   P1         C3  FM  108.00MHz   U4
 A9  FM   87.50MHz              C4  FM  108.00MHz   P4  M
 A0  FM   87.50MHz              C5  FM  108.00MHz   P6  M
 B1  FM   87.50MHz   U5        C6  FM  108.00MHz
 B2  FM   90.00MHz              C7  FM  108.00MHz
 B3  FM   90.00MHz              C8  FM  108.00MHz        M
 B4  AM    990MHz   P0         C9  FM   87.50MHz
 B5  FM   90.00MHz              C0  FM   87.50MHz
```

FIG. 7B

```
TUNER
 CH    INDEX       FREQ         LINK      LINK ON
[A☐]  [News<]  [FM 90.00MHz]   [P8]        MONO CH    FREQ       LINK         PGM SET
 A1  FM  87.50MHz              [PRESET]
 A2  FM  90.00MHz   U4  M       1. HALL  1
[A3  FM  90.00MHz   P7  M]      2. HALL  2
 A4  FM  90.00MHz   P5  M       3. OPERA
 A5  FM 108.00MHz   P8          4. CHURCH
 A6  AM    990kHz   P0          5. JAZZ  CLUB
 A7  AM   1000kHz               6. DISCO
 A8  AM   1000kHz   P1          7. STADIUM
 A9  FM   87.50MHz             [8. LIVE  CONCERT]
 A0  FM   87.50MHz              9. THEATER
 B1  FM   87.50MHz   U5         0. DOLBY SUR
 B2  FM   90.00MHz             PRESS [MEMORY]
 B3  FM   90.00MHz             & [SHIFT]  [1]-[0]
 B4  AM    990kHz   P0
 B5  FM   90.00MHz
```

FIG. 8A

```
TUNER
 CH     INDEX      FREQ         LINK       LIMK  ON
[A□]  [News<]  [FM 90.00MHz]  [P7]         MONO CH    INDEX                    CH     FREQ         LINK
 A1  ┌─INDEX──────────┐         B6  FM 108.00MHz
 A2  │  ◊ LETTER      │         B7  AM    1000kHz
[A3] │  ◊▷POSITION    │         B8  AM     990kHz   P0
 A4  │   [News<]      │         B9  AM     990kHz   U9
 A5  │                │         B0  AM     990kHz
 A6  │ PRESS [MEMORY] │         C1  FM   87.50MHz
 A7  │ & [SHIFT] [1]-[0]│       C2  FM  108.00MHz
 A8  └────────────────┘         C3  FM  108.00MHz   U4
 A9    FM   87.50MHz            C4  FM  108.00MHz   P4  M
 A0    FM   87.50MHz            C5  FM  108.00MHz   P6  M
 B1    FM   87.50MHz  U5        C6  FM  108.00MHz
 B2    FM   90.00MHz            C7  FM  108.00MHz
 B3    FM   90.00MHz            C8  FM  108.00MHz       M
 B4    AM     990kHz  P0        C9  FM   87.50MHz
 B5    FM   90.00MHz            C0  FM   87.50MHz
```

FIG. 8B

```
TUNER
 CH     INDEX      FREQ         LINK       LINK  ON
[A3]  [News<]  [FM 90.00MHz]  [P2]         MONO CH    INDEX     LINK           CH    INDEX     LINK
 A1   ROCK1                     B6   ABC
 A2   POPS1     U4  M           B7   mama1
[A3]  News<     P2  M]          B8   12345     P0
 A4   News<     P5  M           B9   12345     U9
 A5   ABC       P8              B0   12345
 A6   Papa=     P0              C1
 A7   mama1                     C2   ABC
 A8   mama1     P1              C3   ABC       U4
 A9                              C4   ABC       P4  M
 A0                              C5   ABC       P6  M
 B1   ROCK1     U5              C6   ABC
 B2   POPS1                     C7   ABC
 B3   News<                     C8   ABC           M
 B4   Papa=     P0              C7
 B5   JAZZ 1                    C0
```

FIG. 10A

```
┌─────────────────────────────────────────────────┐
│ SOUND FIELD                                     │
│                                                 │
│ [PRESET]         ▮▮▮SUR    ⌒EQ      ╱DDS       │
│                                                 │
│    1. HALL 1      [ON]     [OFF]    [OFF]      │
│    2. HALL 2      [ON]     [OFF]    [OFF]      │
│    3. OPERA       [ON]     [OFF]    [OFF]      │
│    4. CHURCH      [ON]     [ON]     [OFF]      │
│    5. JAZZ CLUB   [ON]     [ON]     [ON]       │
│    6. DISCO       [ON]     [ON]     [ON]       │
│    7. STADIUM     [ON]     [ON]     [ON]       │
│    8. LIVE CONCERT[ON]     [ON]     [ON]       │
│    9. THEATER     [ON]     [ON]     [ON]       │
│    0. DOLBY SUR   [ON]     [OFF]    [OFF]      │
│                                                 │
│ FUNCTION  DTC-87ES                              │
└─────────────────────────────────────────────────┘
```

FIG. 10B

```
┌─────────────────────────────────────────────────┐
│ SOUND FIELD                                     │
│                                                 │
│ [USER]              MEMORY                      │
│                     MODE [LIVE CONCERT]         │
│    1. HALL 1                                    │
│    2. LIVE CONCERT   ▮▮▮SUR    [ON]            │
│    3. LIVE CONCERT                              │
│    4. CHURCH         ⌒EQ       [ON]            │
│    5. JAZZ CLUB                                 │
│    6. DISCO          ╱DDS      [ON]            │
│    7. STADIUM        [ON]     [ON]    [ON]     │
│    8. LIVE CONCERT   [ON]     [ON]    [ON]     │
│    9. THEATER        [ON]     [ON]    [ON]     │
│    0. DOLBY SUR      [ON]     [OFF]   [OFF]    │
│                                                 │
│ FUNCTION  DTC-87ES                              │
└─────────────────────────────────────────────────┘
```

FIG. 13A

```
SOUND FIELD
 PRESET              [Illu]SUR   [⌒]EQ    [/]DDS
    1. HALL 1         [ON]     [OFF]    [OFF]
    2. HALL 2         [ON]     [OFF]    [OFF]
    3. OPERA          [ON]     [OFF]    [OFF]
    4. CHURCH         [ON]     [ON]     [OFF]
    5. JAZZ CLUB      [ON]     [ON]     [ON]
    6. DISCO          [ON]     [ON]     [ON]
    7. STADIUM        [ON]     [ON]     [ON]
    8. LIVE CONCERT   [ON]     [ON]     [ON]
    9. THEATER        [ON]     [ON]     [ON]
    0. DOLBY SUR      [ON]     [OFF]    [OFF]
 FUNCTION  DTC-87ES
```

FIG. 13A

```
SOUND FIELD
 USER                          MEMORY
    1. HALL 1                  MODE [LIVE CONCERT]
    2. LIVE CONCERT
    3. LIVE CONCERT              [Illu]SUR   [ON]
    4. CHURCH
    5. JAZZ CLUB                 [⌒]EQ       [ON]
    6. DISCO
    7. STADIUM                   [/]DDS      [ON]
                      [ON]    [ON]    [ON]
    8. LIVE CONCERT   [ON]    [ON]    [ON]
    9. THEATER        [ON]    [ON]    [ON]
    0. DOLBY SUR      [ON]    [OFF]   [OFF]
 FUNCTION  DTC-87ES
```

FIG. 17A

```
SOUND FIELD
┌─────────────────────────────────────────┐
│ [PRESET]        ▥SUR   ◠EQ    ╱DDS     │
│   1. HALL 1      [ON]   [OFF]  [OFF]   │
│   2. HALL 2      [ON]   [OFF]  [OFF]   │
│   3. OPERA       [ON]   [OFF]  [OFF]   │
│   4. CHURCH      [ON]   [ON]   [OFF]   │
│   5. JAZZ CLUB   [ON]   [ON]   [ON]    │
│   6. DISCO       [ON]   [ON]   [ON]    │
│   7. STADIUM     [ON]   [ON]   [ON]    │
│   8. LIVE CONCERT[ON]   [ON]   [ON]    │
│   9. THEATER     [ON]   [ON]   [ON]    │
│   0. DOLBY SUR   [ON]   [OFF]  [OFF]   │
└─────────────────────────────────────────┘
FUNCTION   DTC-87ES
```

FIG. 17B

```
SOUND FIELD
 [USER]              [MEMORY]
                     MODE [LIVE CONCERT]
   1. HALL 1
   2. LIVE CONCERT    ▥ SUR    [ON]
   3. LIVE CONCERT    ◠ EQ     [ON]
   4. CHURCH          ╱ DDS    [ON]
   5. JAZZ CLUB
   6. DISCO
   7. STADIUM         [ON]  [ON]  [ON]
   8. LIVE CONCERT    [ON]  [ON]  [ON]
   9. THEATER         [ON]  [ON]  [ON]
   0. DOLBY SUR       [ON]  [OFF] [OFF]
FUNCTION   DTC-87ES
```

FIG. 19
| Material | R | G | B |
|---|---|---|---|
| Softer ↑ | 1 | 1 | 0 |
| | 2 | 2 | 1 |
| | 4 | 4 | 3 |
| | 5 | 5 | 4 |
| | 2 | 2 | 2 |
| Standard | 4 | 4 | 4 |
| | 5 | 5 | 5 |
| | 1 | 1 | 2 |
| | 2 | 2 | 3 |
| ↓ | 4 | 4 | 5 |
| Harder | 5 | 5 | 6 |
FIG. 20A
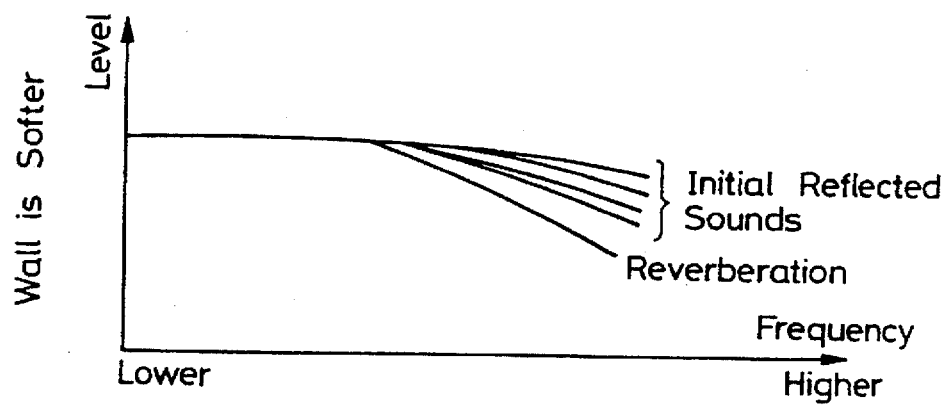
FIG. 20B
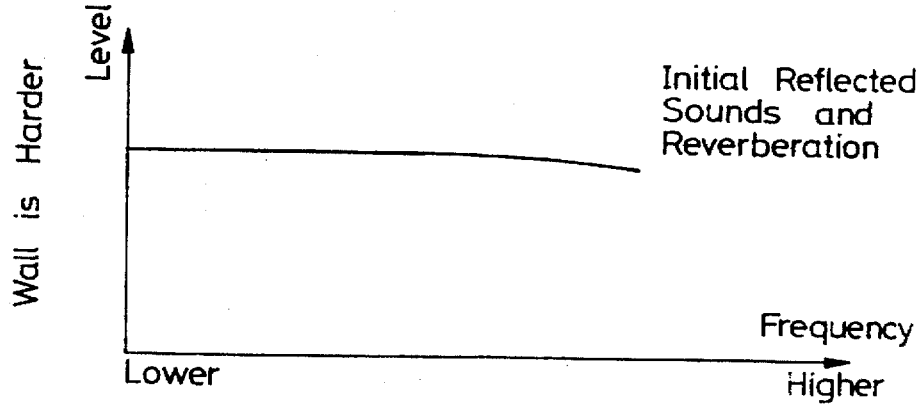

AUDIO EQUIPMENT AND METHOD OF DISPLAYING OPERATION THEREOF

This is a division of application Ser. No. 08/107,681, filed as PCT/JP92/01645 Dec. 17, 1992, now abandoned.

TECHNICAL FIELD

The present invention relates to an audio equipment capable of processing video signals and a method of displaying operation of the acoustic equipment.

BACKGROUND ART

It has been practiced to supply audio signals reproduced from a VTR to an audio equipment to improve reproduced acoustic sounds. It is also customary to supply, simultaneously with the audio signals, video signals from the VTR to the audio equipment, from which the video signals are supplied to a video signal receiver or another VTR. When supplying video signals to another VTR for dubbing purpose or the like, the video signals may be amplified or otherwise processed in the audio equipment in a manner suitable for dubbing the video signals.

Recent years have seen many various modes of signal processing in audio equipment. It is difficult to display necessary modes of signal processing sufficiently on a small-size display disposed on a control panel of audio equipment, for example.

The present invention has been made in view of the above problems.

DISCLOSURE OF THE INVENTION

According to a first invention, there is provided an audio equipment for processing an audio signal and a video signal for a video signal receiver connected thereto, comprising means for detecting an operated state of a control panel, and means for producing a video signal to display an image simulating the control panel on the video signal receiver, the arrangement being such that when the control panel is operated, a video signal is produced in which the display at a position corresponding to a portion of the displayed image which is detected as being operated on the control panel is varied.

According to a second invention, there is provided a method of displaying operation of an audio equipment, comprising the steps of detecting an operated state of a control panel of the audio equipment, and varying an image of an operated portion of an image simulating the control panel.

According to a third invention, there is provided an audio equipment for processing an audio signal and a video signal for a video signal receiver connected thereto, comprising means for selecting and outputting signals from input terminals, and means for storing the names of devices connected to the input terminals and producing a video signal to display a list of the names of the devices, the arrangement being such that when one of the signals from the input terminals is selected, a video signal is produced in which the display at a position corresponding to the selected input terminal is varied on the displayed list.

According to a fourth invention, there is provided a method of displaying operation of an audio equipment, comprising the steps of producing an image to display the names of devices connected to input terminals, detecting a selected one of the signals from the input terminals, and varying an image of a portion corresponding to the selected input terminal on the list.

According to a fifth invention, there is provided a broadcast receiving apparatus for receiving broadcast signals and processing a video signal for a video signal receiver connected thereto, comprising means for storing the frequencies, set names, and sound field setting information of broadcast signals which are selectively receivable, and means for producing a video signal to display a list of the stored frequencies, set names, and sound field setting information on the video signal receiver, the arrangement being such that a video signal is produced in which the display at a position corresponding to a selected broadcast signal is varied on the displayed list.

According to a sixth invention, there is provided a method of displaying operation of a broadcast receiving apparatus, comprising the steps of producing an image to display a list of the frequencies and/or set names and sound field setting information of broadcast signals which are selectively receivable, detecting a selected broadcast signal, and varying an image of a portion corresponding to the selected broadcast signal on the list.

According to a seventh invention, there is provided an audio equipment for processing an audio signal and a video signal for a video signal receiver connected thereto, comprising means for processing an input signal into desired characteristics and outputting the processed input signal, means for storing a plurality of settings of processed characteristics, and means for producing a video signal to display a list of the plurality of settings on the video signal receiver, the arrangement being such that when one of the settings of processed characteristics is selected, a video signal is produced in which the display at a position of the setting of a selected one of the processed characteristics is varied on the list.

According to an eighth first invention, there is provided a method of displaying operation of an audio equipment, comprising the steps of producing an image signal to display a list of a plurality of settings of processed characteristics, detecting the setting of a selected one of the processed characteristics, and varying an image of a portion corresponding the setting of the selected one of the processed characteristics on the list.

According to a ninth invention, there is provided an audio equipment for processing an audio signal and a video signal for a video signal receiver connected thereto, comprising means for processing an input signal into desired sound field characteristics and outputting the processed input signal, means for setting a parameter of processing of the sound field characteristics, and means for producing a video signal to display the set parameter on the video signal receiver, the arrangement being such that when the parameter is set for the shape of a sound field, an image indicative of a standard shape of sound field is displayed on the video signal receiver, and a video signal is produced in which the image is enlarged or contracted as the parameter is varied.

According to a tenth invention, there is provided a method of displaying operation of an audio equipment, comprising the steps of producing an image to display an image indicative of the shape of a standard sound field, detecting setting of a parameter of the shape of a sound field, and enlarging or contracting the image as the parameter is varied.

According to an eleventh invention, there is provided an audio equipment for processing an audio signal and a video signal for a video signal receiver connected thereto, comprising means for processing an input signal into desired sound field characteristics and outputting the processed input signal, means for setting a parameter of processing of the sound field characteristics, and means for producing a video signal to display the set parameter on the video signal receiver, the arrangement being such that when the parameter is set for the material of a wall surface around a sound field, an image indicating the shape of the sound field is displayed on the video signal receiver, and a video signal is produced in which the color of a portion corresponding to the wall surface of the image is varied as the parameter is varied.

According to a twelfth invention, there is provided a method of displaying operation of an audio equipment, comprising the steps of producing an image to display an image indicative of a sound field, detecting setting of a parameter of the material of a wall surface around the sound field, and varying the color of a portion corresponding to the wall surface of the image as the parameter is varied.

BRIEF DESCRIPTION OF THE DRAWINGS

FIGS. 7A and 7B are views illustrative of still another example of operation display process;

FIGS. 8A and 8B are views illustrative of yet another example of operation display process;

FIGS. 10A and 10B are views illustrative of a further example of operation display process;

FIGS. 13A and 13B are views illustrative of another example of operation display process;

FIGS. 17A and 17B are views illustrative of yet another example of operation display process;

FIG. 19 is a diagram showing mixture ratios of colors that are displayed;

FIGS. 20A and 20B are diagrams showing a parameter of a wall surface material;

BEST MODE FOR CARRYING OUT THE INVENTION

Figure 1:
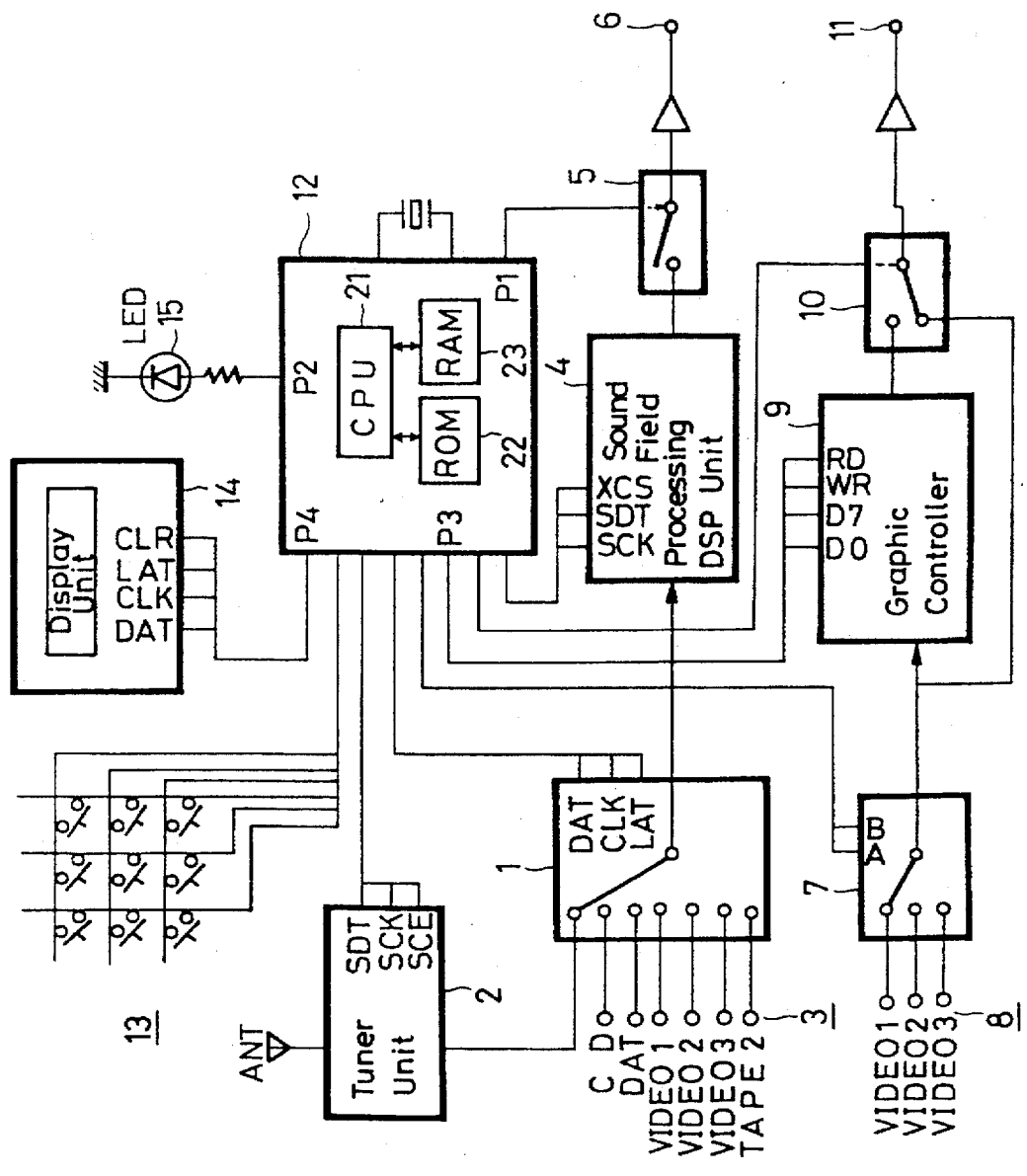
FIG. 1 is a block diagram of an audio equipment according to the present invention.

As shown in FIG. 1, an audio equipment according to the present invention has an audio signal input selector switch 1 that is supplied with a received AM/FM signal from a tuner unit 2, a reproduced signal from a CD player (not shown) connected to an input terminal 3, a reproduced signal from a DAT player (now shown) connected to an input terminal 3, audio signals from three video equipments VIDEO1, VIDEO2, VIDEO3 (not shown) connected to respective input terminals 3, and an audio signal monitored and reproduced from a recording equipment TAPE2 (not shown) connected to an input terminal 3 in a dubbing process, each of the signals being supplied in a stereophonic mode. One of the signals from the input selector switch 1 is supplied to a sound field processing DSP unit 4, which sends the processed signal through a muting switch 5 to an output terminal 6.

The audio equipment also has a video signal input selector switch 7 that is supplied with video signals reproduced from the respective three video equipments VIDEO1, VIDEO2, VIDEO3. The video signal input selector switch 7 supplies one of the video signals to a graphic controller (GDC) 9 which generates a video signal for a displayed image. One of the signal generated by the GDC 9 and the original signal is selected by a switch 10 and supplied to an output terminal 11.

The audio equipment further includes a system control microcomputer 12. The microcomputer 12 has a CPU 21, a ROM 22, and a RAM 23m, and effects control operation according to a program written in the ROM 22. Signals from key switches 13 of a control panel are supplied to the microcomputer 12 to control the input selector switches 1, 7, the tuner unit 2, the DSP unit 4, the GDC 9, and the switches 5, 10. Statuses of the controlled components are displayed on a display unit 14 and an LED 15 on the control panel.

Figure 2:
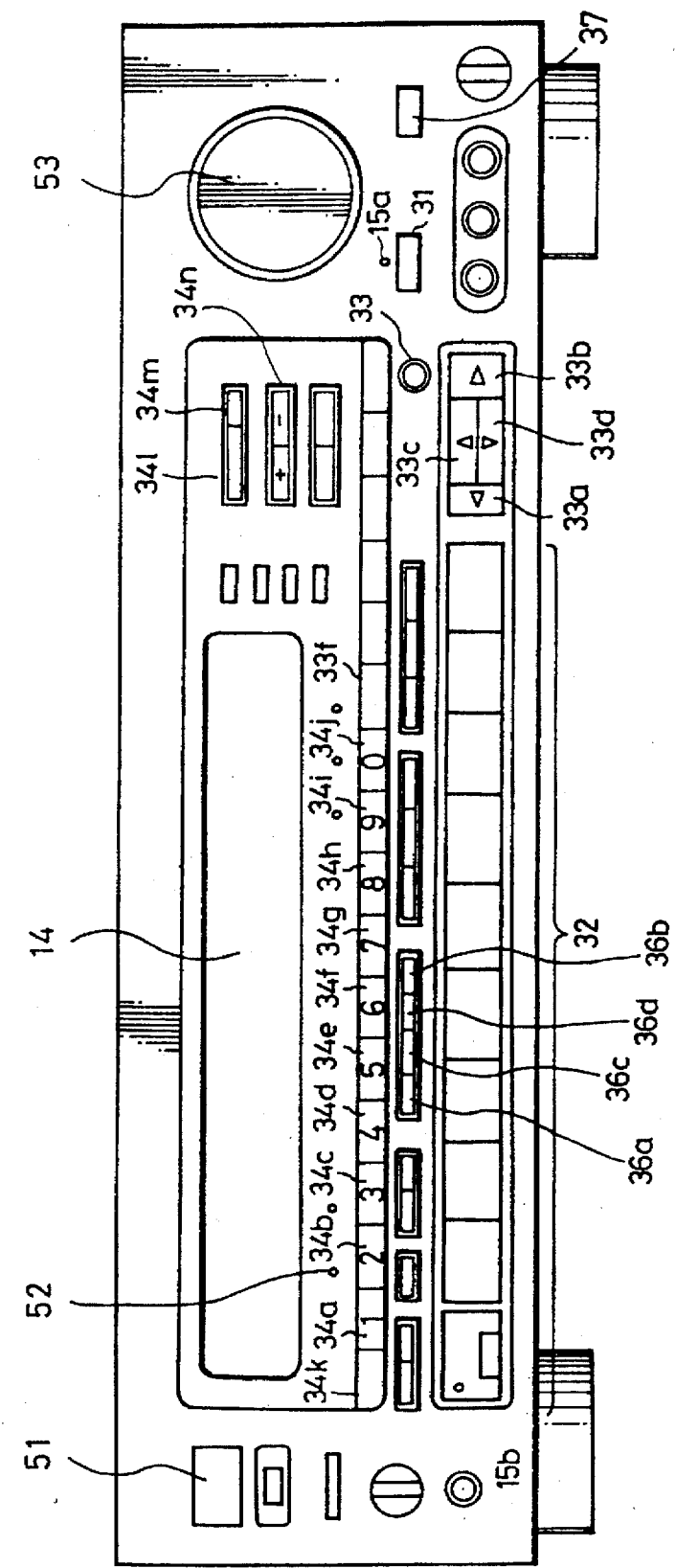
FIG. 2 is a front elevational view of a control panel of the audio equipment.

The control panel of the audio equipment is arranged as shown in FIG. 2. In FIG. 2, the control panel has at least a power supply switch 51, an LED 52 for indicating a display on a video signal receiver, a display unit 14, and a dial 53 for volume control. The control panel also has an operation key 31 corresponding to a key switch 13 for muting an audio signal, and an LED 15a for indicating an operation of the operation key 31.

The control panel also includes a group of operation keys 32 corresponding to key switches 13 for controlling functions when the input selector switches 1, 7 are operated. The operation keys 32 include an operation key 32b corresponding to a key switch 13 for selecting an audio signal that is monitored and reproduced from a recording equipment TAPE2 (not shown) through the input selector switch 1 during dubbing operation, and an LED 15b for indicating an operation of the operation key 32b.

Figure 3A:
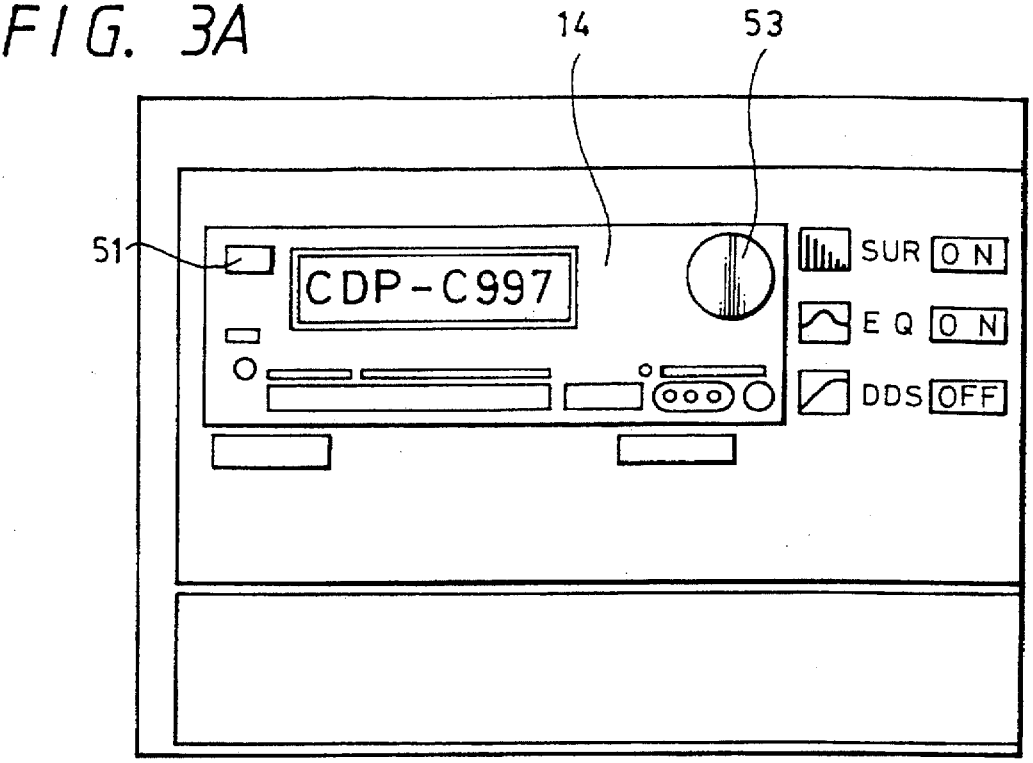
FIGS. 3A and 3B are views illustrative of an example of operation display process.
Figure 3B:
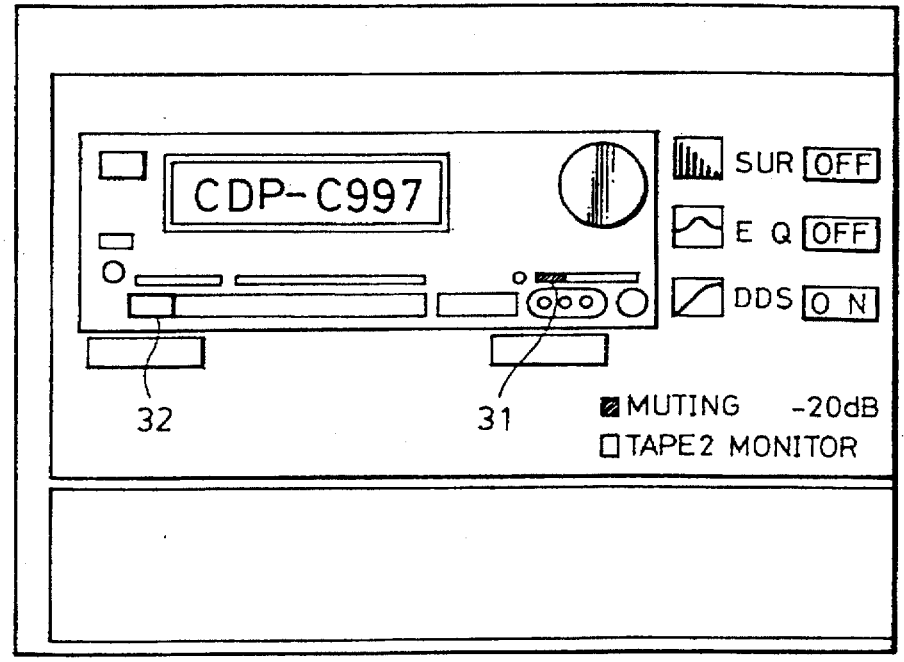

The graphic controller (GDC) 9 generates video signals for displayed images as shown in FIGS. 3A and 3B. In FIG. 3A, an image which simulates the control panel is displayed on a left-hand side of the image displayed on the display unit 14. The simulating image includes images of the power supply switch 51, the display 14, the dial 53, etc.

When one of the operation keys 31, 32 is operated, the display at the position of the operated key is altered as shown in FIG. 3B. In the example shown in FIG. 3, a bright display is produced in a position corresponding to the operation key 31 which mutes the audio signal, and a display in the shape of a bright frame is produced in a position corresponding to the operation key 32b which selects the audio signal monitored and reproduced from the recording equipment TAPE2 during dubbing operation.

Displays similar to those in the displayed image and indicating the function of the operated key are produced at a lower right position in the displayed image. The name of the device which is selected by the input selector switches 1, 7 is displayed in a position corresponding to the image of the display unit 14 in the image simulating the control panel. Functions displayed in the display unit 14, for example, are displayed at enlarged scale in a upper right position in the displayed image.

The audio equipment thus displays highly clearly data of the operated key in the image which simulates the control panel.

Figure 4:
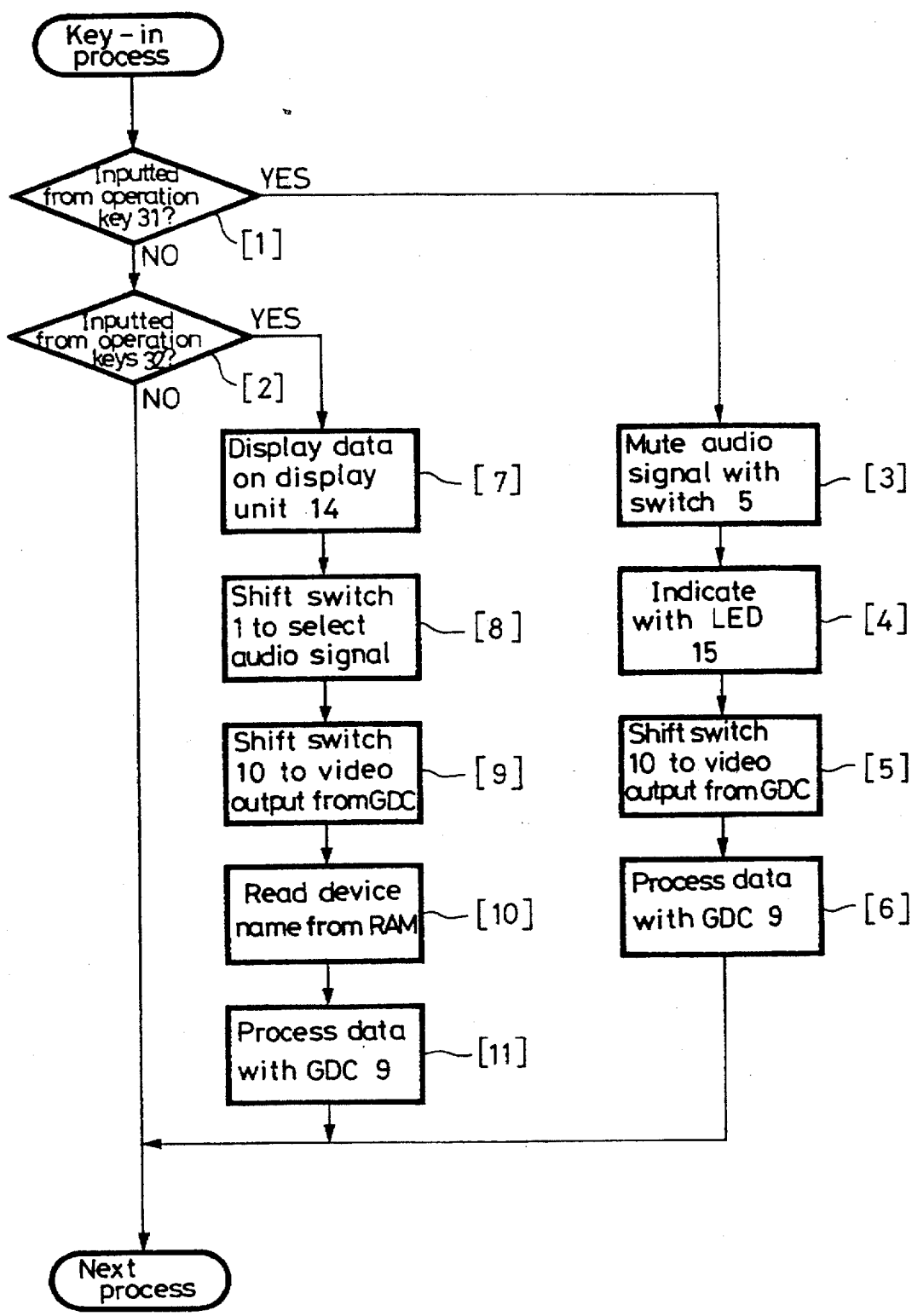
FIG. 4 is a flowchart of the operation display process.

FIG. 4 shows a flowchart of a key-in process for the above operation display process. When the key-in process is started, a step [1] determines whether the operation key 31 is operated or not, and then a step [2] determines whether the operation keys 32 are operated or not. If NO in the steps [1], [2], then control goes to a next process. If YES in the step [1], then the switch 5 is turned off in a step [3] and the LED 15 is energized in a step [4]. The switch 10 is shifted to the GDC 9 in a step [5], and display data are supplied to the GDC 9 in a step [6], after which control goes to the next process.

The above displays are thus carried out in the manner described above.

The control panel shown in FIG. 2 has a group of operation keys 33 corresponding to key switches 13 for registering the names of input devices. The operation keys 33 include four upward, downward, leftward, and rightward operation keys 33a~33d, a start operation key 33e, and a memory operation key 33f, for example.

Figure 5A:
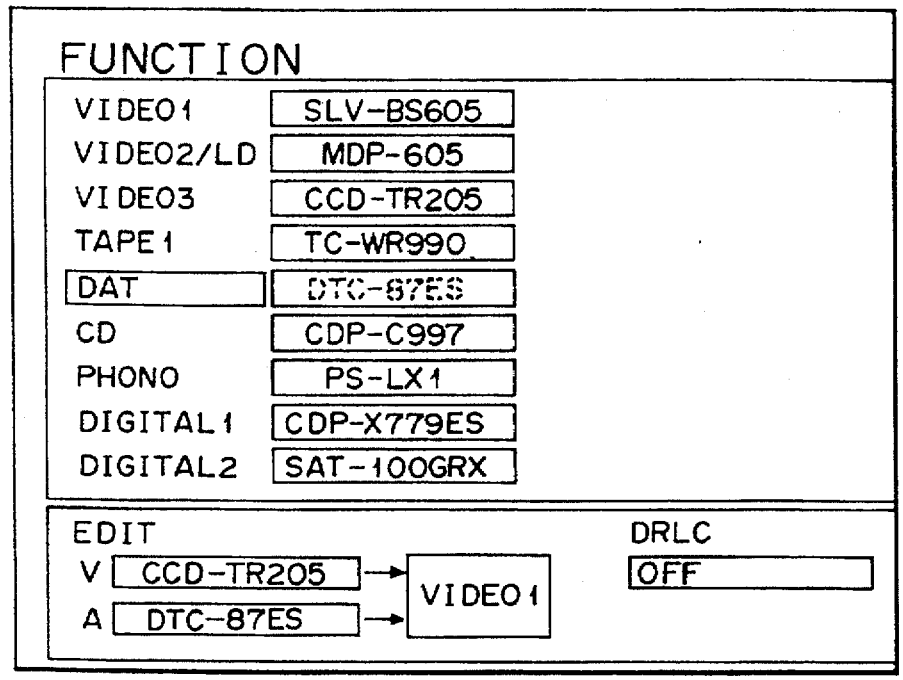
FIGS. 5A and 5B are views illustrative of another example of operation display process.
Figure 5B:
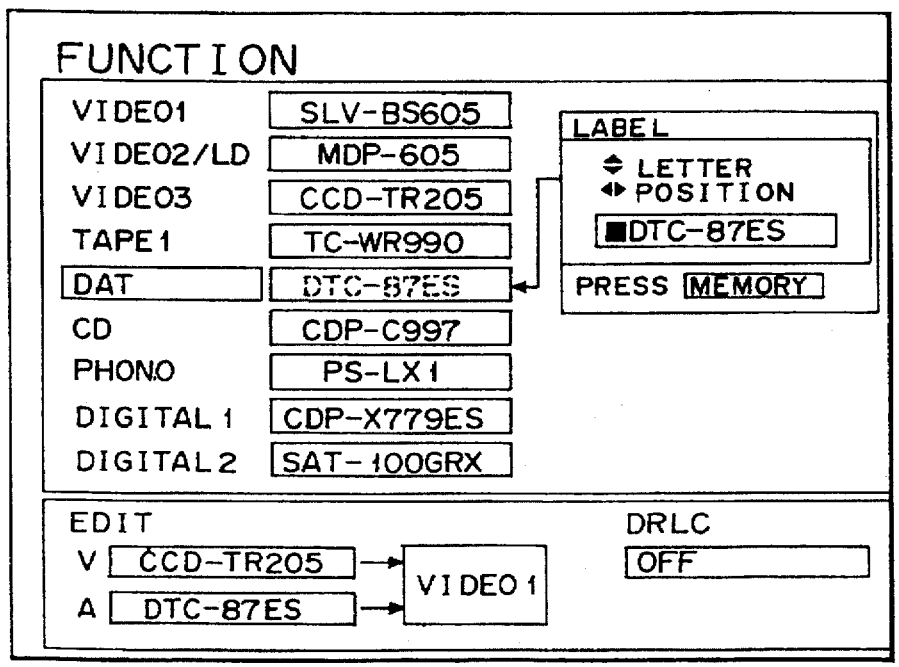

The graphic controller (GDC) of the audio equipment generates video signals for displayed images as shown in FIGS. 5A and 5B. In FIG. 5A, the original names of the respective input terminals 3 are displayed in a left-hand side of the image, and the names of devices connected to the respective input terminals 3 are displayed in a central portion of the image. When one of the input devices is selected by the operation key 32, the display "DAT" is surrounded by a frame as shown, and the color of the displayed name of the device is altered.

When the start operation key 33e is operated with the input device thus selected, an image for registering the name of the input device is displayed as shown in FIG. 3B. When the leftward and rightward operation keys 33a, 33b, for example, are operated, the position of characters for names to be registered is changed. The upward and downward operation keys 33c, 33d can be operated in any desired position. When the upward and downward operation keys 33c, 33d are operated in a desired position, the character displayed in that position is changed.

The available characters include alphabetical letters in upper and lower cases, numerals, simple symbols, etc., and can successively be displayed when the operation keys 33c, 33d are operated. The name of a desired device can be produced by operating the operation keys 33a–33d successively. When the name of a device is completed, the memory operation key 33f is operated to register the name of the device.

If an editing process (EDIT) is carried out, then the name of the input device is displayed in a lower portion of the displayed image. The display is produced by copying the name which has been registered. If the audio equipment supplies the audio and video signals to another room (DRLC), then the name of the device which produces the signal that is supplied to the other room is displayed. This display is also produced by copying the name which has been registered.

The audio equipment thus displays highly clearly a selected signal with a list of names of devices connected to the input terminals 3.

Figure 6:
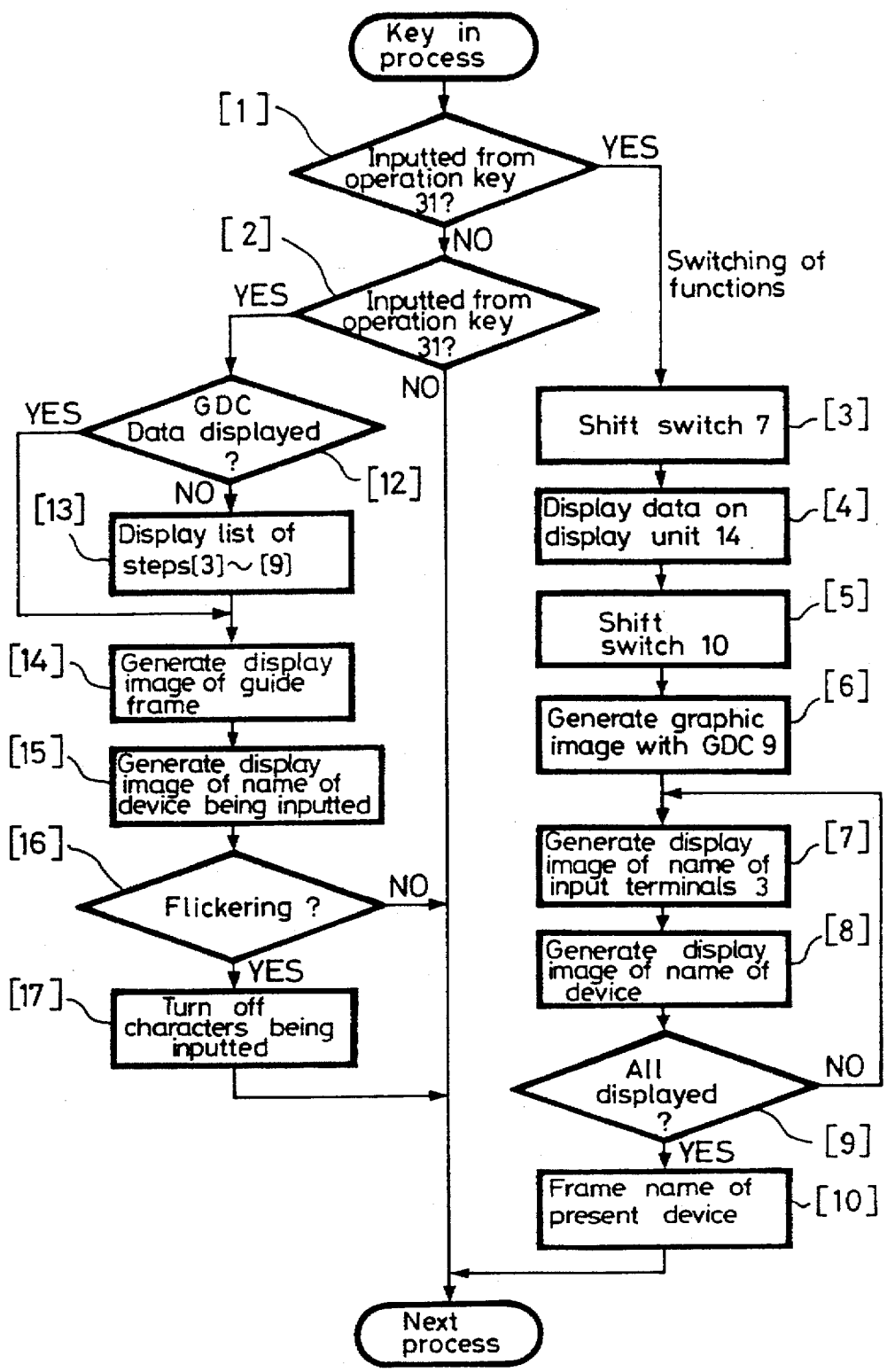
FIG. 6 is a flowchart of the operation display process.

FIG. 6 shows a flowchart of a key-in process for the above operation display process. When the key-in process is started, a step [1] determines whether the operation keys 32 are operated or not, and then a step [2] determines whether the operation keys 33 are operated or not. If NO in the steps [1], [2], then control goes to a next process. If YES in the step [1], then the switch 7 is shifted in a step [3], and then data is displayed on the display unit 14 in a step [4]. The switch 10 is shifted to the GDC 9 in a step [5], and display data is supplied to the GDC 9 in a step [6]. A display image of original names of the input terminals 3 is generated in a step [7], and a display image of names of devices connected to the input terminals 8 is generated in a step [8]. A step [9] then determines whether all names are displayed or not. If not displayed yet, then control returns to the step [7]. If all names are displayed, then the display of the name of the selected device is altered in a step [10], after which control goes to the next process.

If YES in the step [2], then a step [12] determines whether data from the GDC 9 is displayed or not. If not displayed, then the steps [3]~[9] are executed in a step [13]. If displayed, then the display of the name of the selected device is altered in a step [14]. A display image of the name of the device being inputted is generated in a step [15], which is followed by a step [16] that determines whether the display is flickering or not. If not flickering, then control proceeds to the next process. If flickering, then a display image in which the characters being inputted are turned off is generated in a step [17], from which control goes to the next process.

The above displays are thus carried out in the manner described above.

The control panel shown in FIG. 2 also has operation keys 34 corresponding to key switches 13 for selecting a broadcast signal (selective reception). The operation keys 34 include operation keys 34a~34j for selecting numerals ranging from 1 to 0, an operation key 34k for shifting letters A, B, C, an operation key 34l for directly setting a selected station, and operation keys 34m, 34n for automatically selecting a station or for selecting a station based on an index as described later on.

The operation keys 33 on the control panel also correspond to key switches 13 for registering desired set names of broadcast signals. The operation keys 33 include four upward, downward, leftward, and rightward operation keys 33a~33d, a start operation key 33e, and a memory operation key 33f, for example. The control panel also includes an operation key 35 for setting sound fields as described later on.

The operation keys 34a~34j, 34k are used to select broadcast signals in a total of 30 channels. When the numerical value of a frequency is inputted with the operation keys 34a~34j after the operation key 34l has been operated, a broadcast signal of that frequency is directly selected.

When the operation key 34m is operated, the frequencies are swept in a direction (+ or − determined by the operation key 34n) to automatically select a broadcast signal. With the broadcast signal directly or automatically selected, the operation keys 34a~34j, 34k, and the memory operation key 33f are operated to set the frequency of the selected broadcast signal to a selected channel. The set information is stored in the RAM 23.

The graphic controller (GDC) 9 of the audio equipment generates video signals of display images as shown in FIGS.

7A and 7B. In FIG. 7A, the image is divided into left and right images, and the numbers of a total of 30 channels composed of letters A, B, C and numerals 1~0 are displayed in left-hand sides of each of the left and right images. The bands FM/AM and the frequencies of broadcast signals that can selectively be received are displayed centrally in the left and right images, and information indicative of set sound fields is displayed in right-hand sides of each of the left and right images. When a channel is selected with the operation keys 34, the selected channel which is displayed is surrounded by a frame and its displayed color is altered as indicated at the channel A3.

With the channel selected, when the operation key 35 for setting a sound field is operated, an image for setting a sound field is displayed as shown in FIG. 7B. A desired sound field is established when the operation keys 34a~34j, for example, are operated. There are available typical 10 sound fields that have been preset in the DSP unit 4 and a maximum of 10 sound fields that can be set by the user. When the memory operation key 33f is operated, one of the available sound fields can be set in the selected channel.

With the channel selected, when the start operation key 33e is operated, an image for registering a set name is displayed as shown in FIG. 8A. When the leftward and rightward operation keys 33a, 33b, for example, are operated, the position of characters for names to be registered is changed. When the upward and downward operation keys 33c, 33d are operated in any desired position, the character displayed in that position is changed. The available characters include alphabetical letters in upper and lower cases, numerals, simple symbols, etc., and can successively be displayed when the operation keys 33c, 33d are operated. A desired set name can be produced by operating the operation keys 33a~33d successively. When the set name is completed, the memory operation key 33f is operated to register the set name.

The graphic controller (GDC) 9 switches between the above image and a display image shown in FIG. 8B. The image shown in FIG. 8B is divided into left and right images, and the numbers of a total of 30 channels composed of letters A, B, C and numerals 1~0 are displayed in left-hand sides of each of the left and right images. The bands FM/AM and the set names of broadcast signals that can selectively be received are displayed centrally in the left and right images, and information indicative of set sound fields is displayed in right-hand sides of each of the left and right images. When a channel is selected with the operation keys 34, the selected channel which is displayed is surrounded by a frame and its displayed color is altered as indicated at the channel A3. When broadcast signals are selected based on indexes, only those broadcast signals having the same set name are successively selected.

The audio equipment thus clearly displays the states of selectively received broadcast signals on a list of the frequencies of broadcast signals, desired set names, and sound field setting information.

Figure 9:
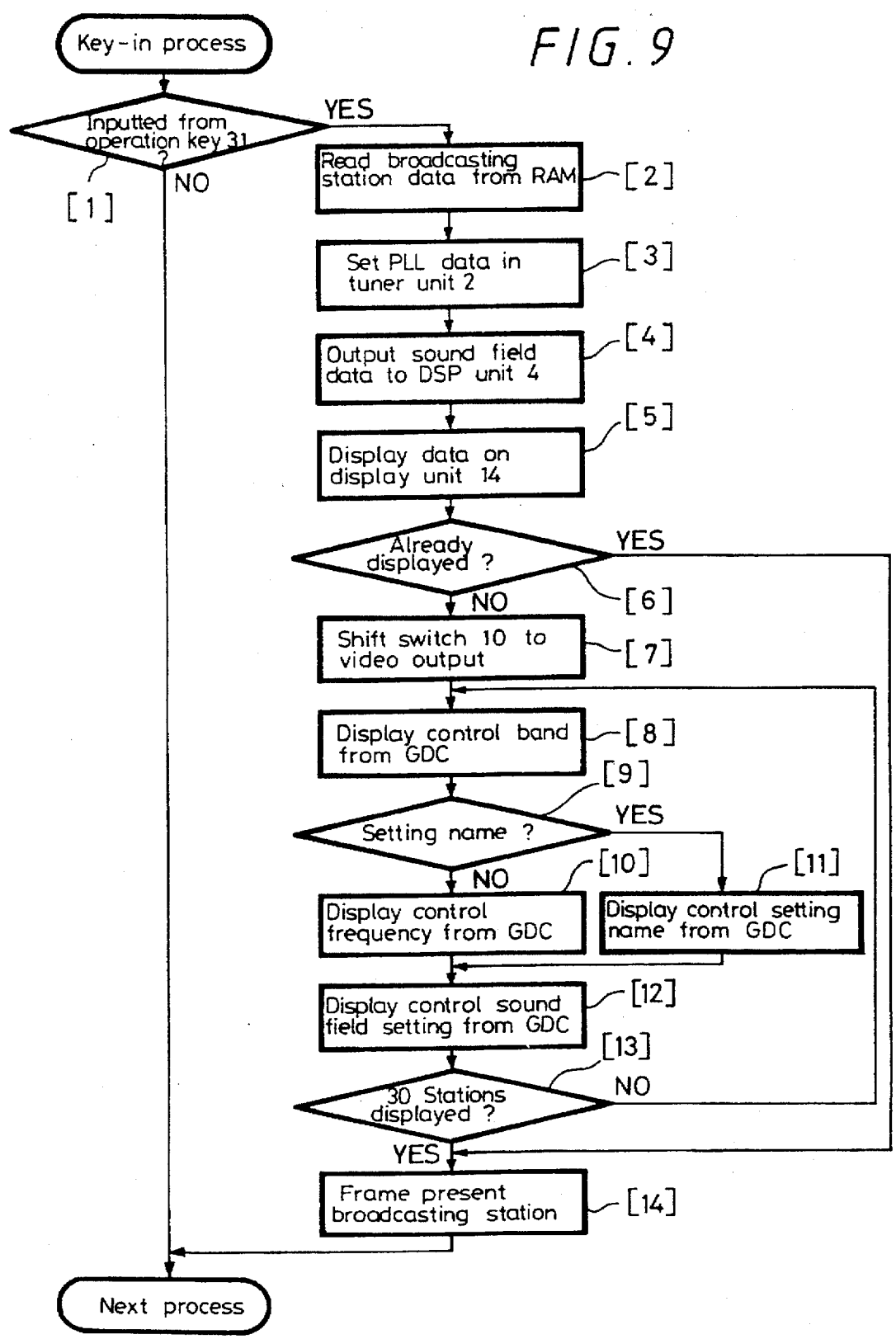
FIG. 9 is a flowchart of the operation display process.

FIG. 9 shows a flowchart of a key-in process for the above operation display process. When the key-in process is started, a step [1] determines whether the operation keys 34 are operated or not. If NO, then control proceeds to a next process. If YES, data stored in the RAM 23 is read in a step [2], and a frequency is set in the tuner unit 2 in a step [3]. A step [4] sets a sound field in the DSP unit 4, and a step [5] displays data on the display unit 14.

A step [6] determines whether data has already been displayed or not. If YES, control goes to the next process. If NO, the switch 10 is shifted to the GDC 9 in a step [7], and then band display data is supplied to the GDC 9 in a step [8]. A step [9] determines whether there is a setting name or not. If there is no setting name (NO), then display data for a frequency is supplied to the GDC 9 in a step [10]. If there is a setting name (YES), then display data for the setting name is supplied to the GDC 9 in a step [11].

Display data for setting a sound field is supplied to the GDC 9 in a step [12]. A step [13] then determines whether 30 stations have been displayed or not. If NO, then control returns to the step [8]. If YES, then a display image in which a channel being received is surrounded by a frame is generated. Thereafter, control goes to the next process.

The above display can therefore be carried out in the manner described above.

The control panel shown in FIG. 2 also has operation keys corresponding to key switches 13 for selecting settings for characteristic processing. The 10 operation keys 34a~34j indicative of the numerals 1~0 double as these operation keys.

The operation keys 33 on the control panel also correspond to key switches 13 for the user to provide a desired sound field. The operation keys 33 include four upward, downward, leftward, and rightward operation keys 33a~33d, a start operation key 33e, and a memory operation key 33f, for example.

The control panel also includes operation keys 36 corresponding to key switches 13 for the user to set a desired equalizer curve. The operation keys 36 include an operation key 36a for turning on and off an equalizer, an operation key 36b for displaying an equalizer curve, an operation key 36c for controlling an equalizer band, and an operation key 36d for controlling the level of the middle range of the equalizer curve.

The control panel also includes an operation key 37 corresponding to a key switch 13 for the user to provide a desired dynamic range. The operation key 37 serves to turn on and off a dynamic range correcting mode, for example.

The graphic controller (GDC) 9 of the audio equipment generates video signals of display images as shown in FIGS. 10A and 10B. In FIG. 10A, preset characteristics stored in the ROM 22 are displayed. The names of basic sound fields are displayed in a left-hand side of the image, and the on and off states of a sound field (surround) mode, an equalizer mode, and a dynamic range correcting mode are displayed in a right-hand side of the image. When the name of a desired sound field is selected with the operation keys 34a~34j, the displayed name is surrounded by a frame as indicated at HALL 1, for example. Audio signals can thus be processed in one of the 10 basic sound fields.

If the user wishes to set desired characteristics, then the start operation key 33e is operated. When the start operation key 33e is operated, an image for setting characteristics is displayed as shown in FIG. 10B. When the operation keys 33a~33d are operated, the characteristics of a sound field (surround) are variously changed.

Figure 11A:
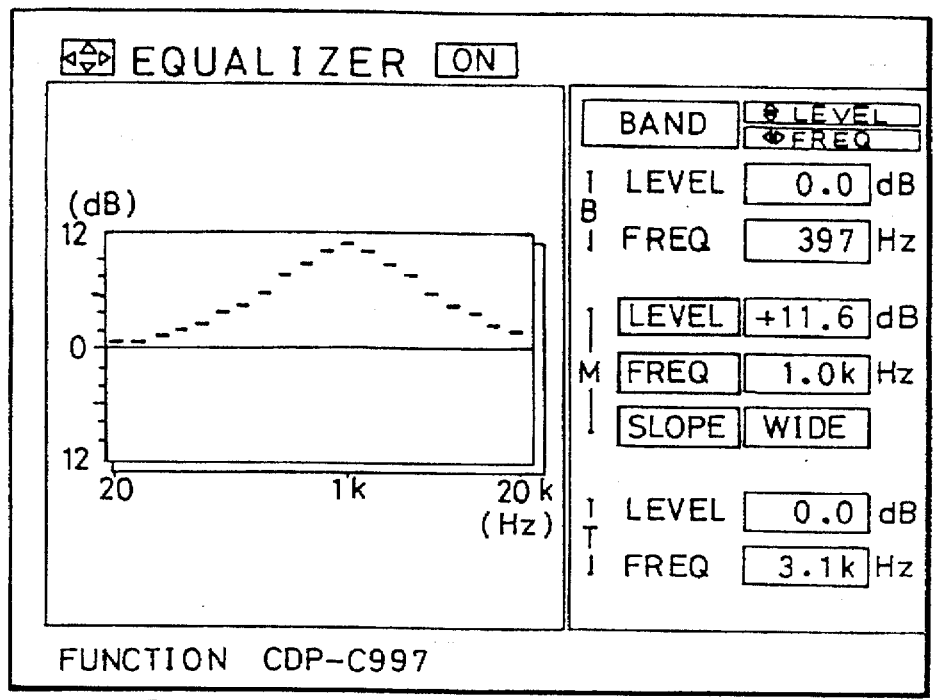
FIGS. 11A and 11B are views illustrative of a still further example of operation display process.
Figure 11B:
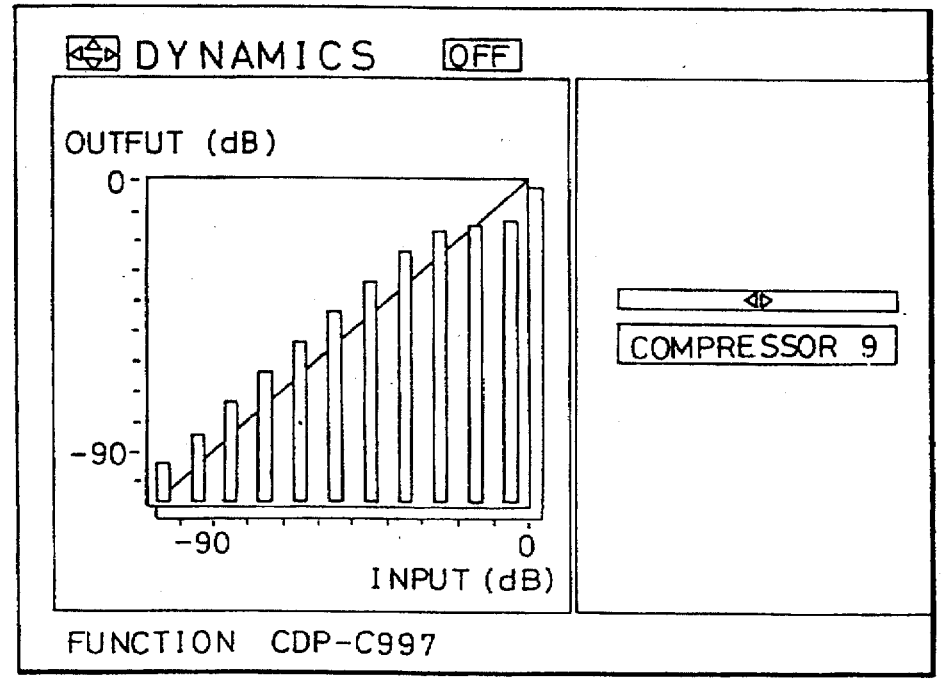

To set a desired equalizer curve, the start operation key 33e is operated with the operation keys 36a on, and the display operation key 36b is operated. Now, an image for setting an equalizer is displayed as shown in FIG. 11A. When the operation key 36c for controlling the equalizer band is operated and the operation keys 33a~33d are operated, the level of each frequency is controlled. As the level of each frequency is controlled, the curve of the image is varied. When required, the level of the middle range of the equalizer curve is controlled with the operation key 36d. The above control processes are effected in each of the bands until the entire equalizer curve (characteristics) is established.

To provide a desired dynamic range, the start operation key 33e is operated with the dynamic range correcting mode being on with the operation key 37. Now, an image for providing a dynamic range is displayed as shown in FIG. 10B. When the operation keys 33a, 33b are operated, the characteristic curve of a dynamic range is controlled to change from a compressor curve into an expander curve. As the characteristic curve of a dynamic range is controlled, the curve in the image is varied.

When the sound field (surround), the equalizer curve, and the dynamic range have achieved desired characteristics, the memory operation key 33f is operated, and the operation keys 34a~34j are operated to store the set characteristics in addresses in the RAM 23 that have been designated by the operation keys 34a~34j.

The audio equipment can thus clearly display selected states of signals on a list of a plurality of settings.

Figure 12:
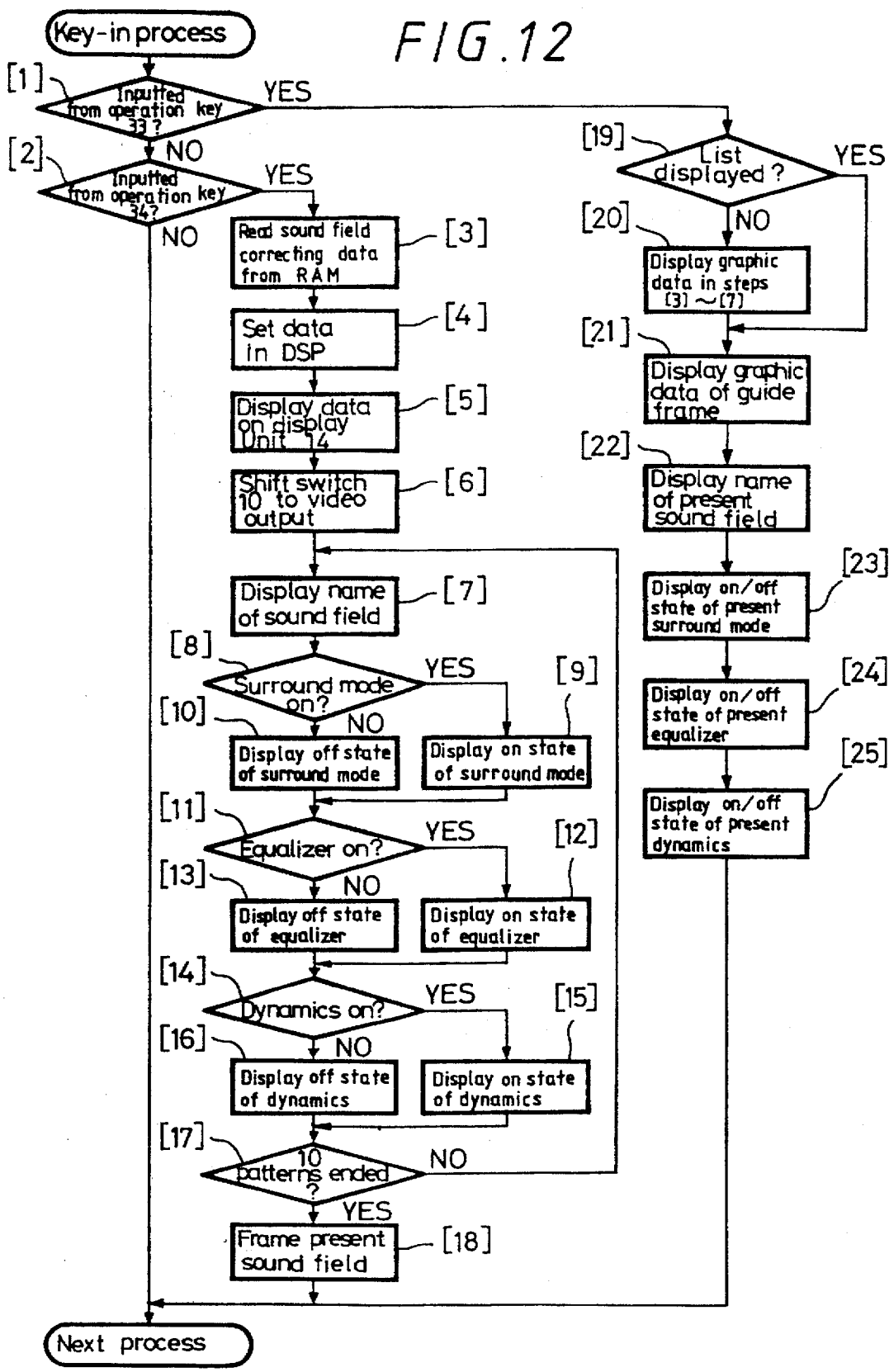
FIG. 12 is a flowchart of the operation display process.

FIG. 12 shows a flowchart of a key-in process for the above operation display process. When the key-in process is started, a step [1] determines whether the operation keys 33 are operated or not and a step [2] determines whether the operation keys 34 are operated or not. If NO in the steps [1], [2], then control proceeds to a next process. If YES in the step [2], data stored in the RAM 23 is read in a step [3], and the read data is set in the DSP 4 in a step [4]. A step [5] displays the data on the display unit 14, and a step [6] shifts the switch 10 to the GDC 9.

Thereafter, a step [7] supplies display data of basic sound fields to the GDC 9. A step [8] determines whether a sound field (surround) correcting mode is on or not. If on, then display data "ON" is supplied to the GDC 9. If off, then display data "OFF" is supplied to the GDC 9. Thereafter, a step [8] determines whether a sound field (surround) correcting mode is on or not. If on, then display data "ON" is supplied to the GDC 9 in a step [9]. If off, then display data "OFF" is supplied to the GDC 9 in a step [10]. A step [11] determines whether an equalizer mode is on or not. If on, then display data "ON" is supplied to the GDC 9 in a step [12]. If off, then display data "OFF" is supplied to the GDC 9 in a step [13]. Thereafter, a step [14] determines whether a dynamic range correcting is on or not. If on, then display data "ON" is supplied to the GDC 9 in a step [15]. If off, then display data "OFF" is supplied to the GDC 9 in a step [16].

A step [17] determines whether data of 10 sound field characteristics have been displayed or not. If NO, then control goes back to the step [7]. If YES, a step [18] generates a display image in which the display of a selected sound field is surrounded by a frame. Thereafter, control goes to the next process.

If YES in the step [1], then a step [19] determines whether data from the GDC 9 is displayed or not. If not displayed, then the steps [3]~[17] are executed in a step [20]. If displayed, the display of the selected sound field is altered in a step [21]. A step [22] generates a display image of the selected sound field, and a step [23] generates a display image of an on/off state of the sound field (surround) correcting mode for the selected sound field. A step [24] generates a display image of an on/off state of the equalizer mode for the selected sound field, and a step [25] generates a display image of an on/off state of the dynamic range correcting mode for the selected sound field. Thereafter, control goes to the next process.

The above display can therefore be carried out in the manner described above.

The control panel shown in FIG. 2 also has operation keys corresponding to key switches 13 for selecting settings for sound field (surround) characteristic processing. The 10 operation keys 34a~34j indicative of the numerals 1~0 double as these operation keys.

The control panel also has operation keys corresponding to key switches 13 for the user to change to a desired sound field. The start operation key 33e and the four upward, downward, leftward, and rightward operation keys 33a~33d double as these operation keys.

The graphic controller (GDC) 9 of the audio equipment generates video signals of display images as shown in FIGS. 13A and 13B. In FIG. 13A, preset characteristics stored in the ROM 22 are displayed. The names of basic sound fields are displayed in a left-hand side of the image, and the on and off states of a sound field (surround) mode, an equalizer mode, and a dynamic range correcting mode are displayed in a right-hand side of the image. When the name of a desired sound field is selected with the operation keys 34a~34j, the displayed name is surrounded by a frame as indicated at HALL 1, for example. Audio signals can thus be processed in one of the 10 basic sound fields.

The start operation key 33e is operated to display an image for setting characteristics as shown in FIG. 10B. When the operation keys 33a~33d, for example, are operated, the characteristics of a sound field (surround) are variously changed.

The characteristics of a sound field (surround) comprise parameters including the size of a room (the shape of a sound field), the material of a wall surface, the position of a seat, the level of a surround effect, the duration of a reverberation. Desired ones of these parameters are selected with the operation keys 33a, 33b. When the parameter indicative of the size of a room is selected, an image for setting the size of a room is displayed as shown in FIGS. 14A and 14B.

Figure 14A:
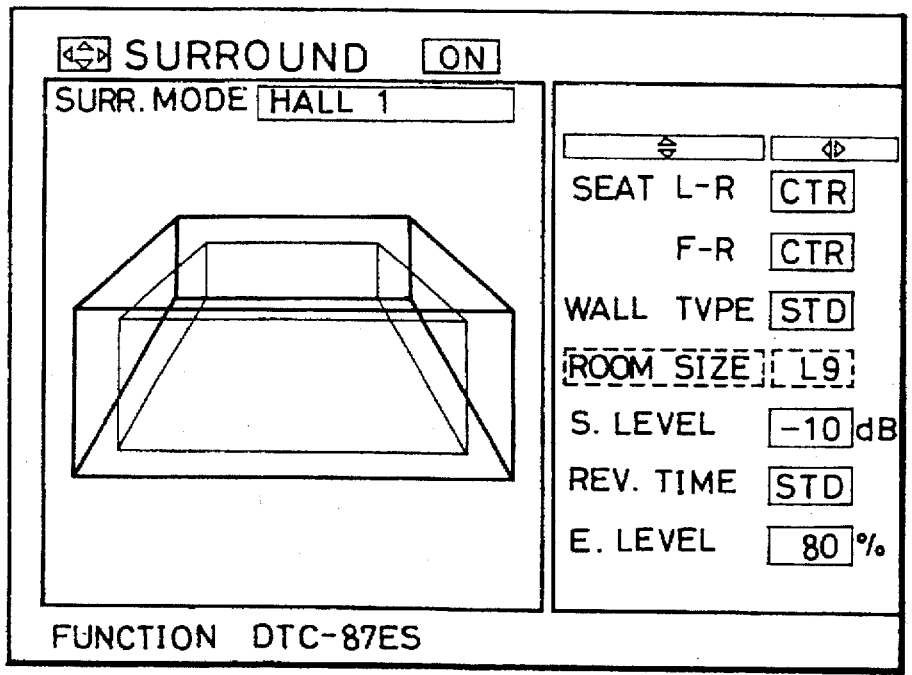
FIGS. 14A and 14B are views illustrative of still another example of operation display process.
Figure 14B:
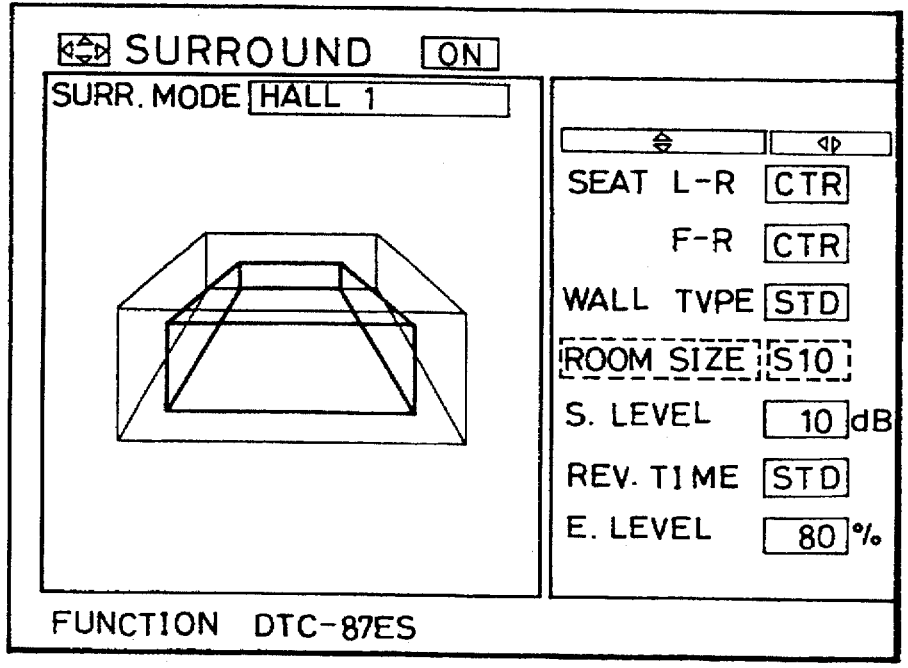

Then, the operation keys 33c, 33d are operated to modify the parameter indicative of the size of a room, thus varying the image as shown in FIG. 14A or 14B. In FIGS. 14A and 14B, thinner lines represent the size of a standard room (the shape of a sound field). As the operation keys 33c, 33d are operated, an image indicated by thicker lines is enlarged or contracted.

Figure 15A:
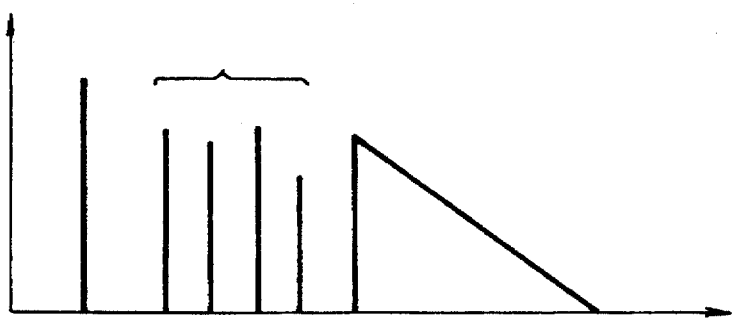
FIGS. 15A and 15B are diagrams showing a parameter of the size of a sound field.
Figure 15B:
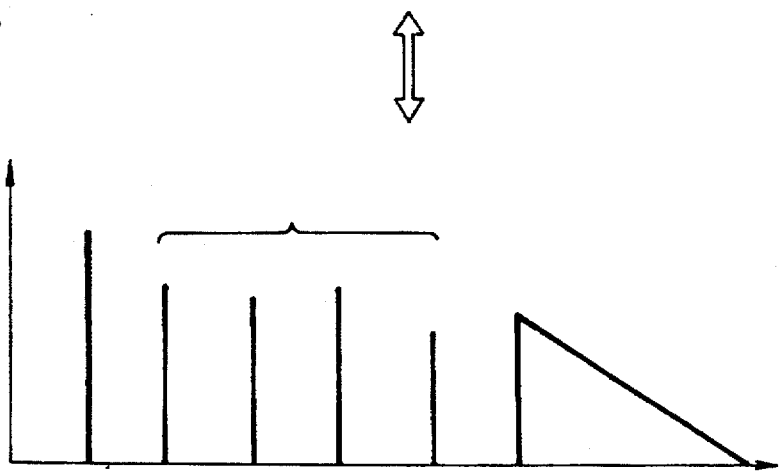

The parameter indicative of the size of a room corresponds to the time for which reflected sounds simulated as shown in FIG. 15A or 15B endures. Since the representations of FIGS. 15A and 15B are difficult to understand, the size of a room is displayed as an image as shown in FIGS. 14A and 14B for an easier visual recognition of the room size.

The audio equipment thus clearly displays an image representing the shape of a standard sound field, which image can be enlarged or contracted as the parameter of the size of the sound field is modified.

Figure 16:
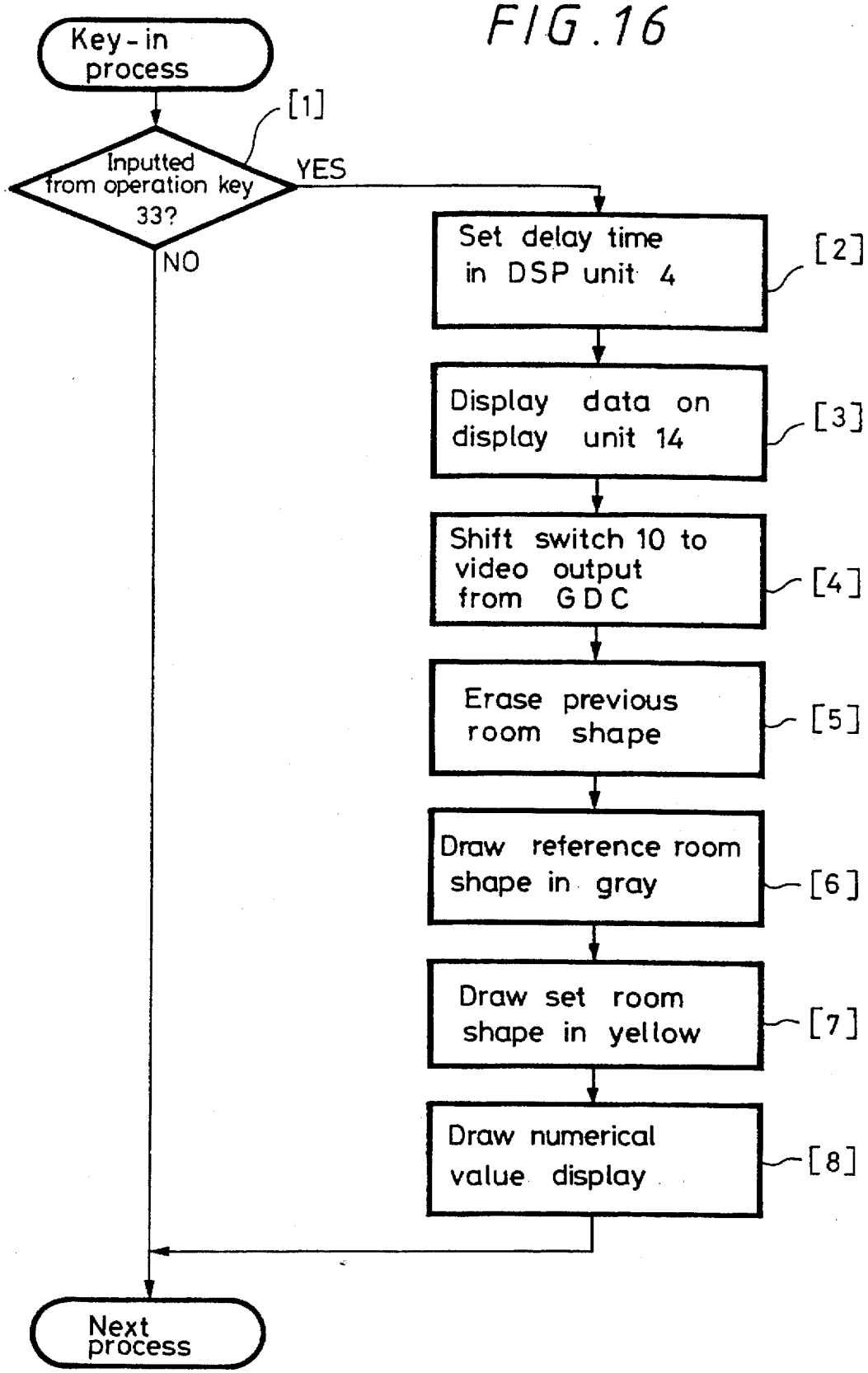
FIG. 16 is a flowchart illustrative of the parameter of the size of a sound field.

FIG. 16 shows a flowchart of a key-in process for the above operation display process. When the key-in process is started, a step [1] determines whether the operation keys 33 are operated or not. If NO, control proceeds to a next process. If YES, delay time data stored in the RAM 23 is read and set in the DSP unit 4 in a step [2]. The data is then displayed on the display unit 14 in a step [3], and the switch 10 is shifted to the GDC 9 in a step [4].

In a step [5], the previous display data from the GDC 9 is erased. Display data (represented by thinner lines) of the shape of a standard sound field is supplied in a step [6]. Display data of the shape of a set sound field set is supplied in a step [7]. Then, numerical display data is supplied in a step [8], after which control goes to the next process.

The above display can therefore be carried out in the manner described above.

While the size of a room has been described above as the shape of a sound field, the present invention is also applicable to changing of the shape of a sound field such as a square or sectorial sound field, for example.

The control panel shown in FIG. 2 also has operation keys corresponding to key switches 13 for selecting settings for sound field (surround) characteristic processing. The 10 operation keys 34a~34j indicative of the numerals 1~0 double as these operation keys.

The control panel also has operation keys corresponding to key switches 13 for the user to change to a desired sound field. The start operation key 33e and the four upward, downward, leftward, and rightward operation keys 33a~33d double as these operation keys.

The graphic controller (GDC) 9 of the audio equipment generates video signals of display images as shown in FIGS. 17A and 17B. In FIG. 17A, preset characteristics stored in the ROM 22 are displayed. The names of basic sound fields are displayed in a left-hand side of the image, and the on and off states of a sound field (surround) mode, an equalizer mode, and a dynamic range correcting mode are displayed in a right-hand side of the image. When the name of a desired sound field is selected with the operation keys 34a~34j, the displayed name is surrounded by a frame as indicated at HALL 1, for example. Audio signals can thus be processed in one of the 10 basic sound fields.

The start operation key 33e is operated to display an image for setting characteristics as shown in FIG. 17B. When the operation keys 33a~33d, for example, are operated, the characteristics of a sound field (surround) are variously changed.

The characteristics of a sound field (surround) comprise parameters including the size of a room (the shape of a sound field), the material of a wall surface, the position of a seat, the level of a surround effect, the duration of a reverberation. Desired ones of these parameters are selected with the operation keys 33a, 33b. When the parameter indicative of the size of a room is selected, an image for setting the material of a wall surface is displayed as shown in FIGS. 18A and 18B.

Figure 18A:
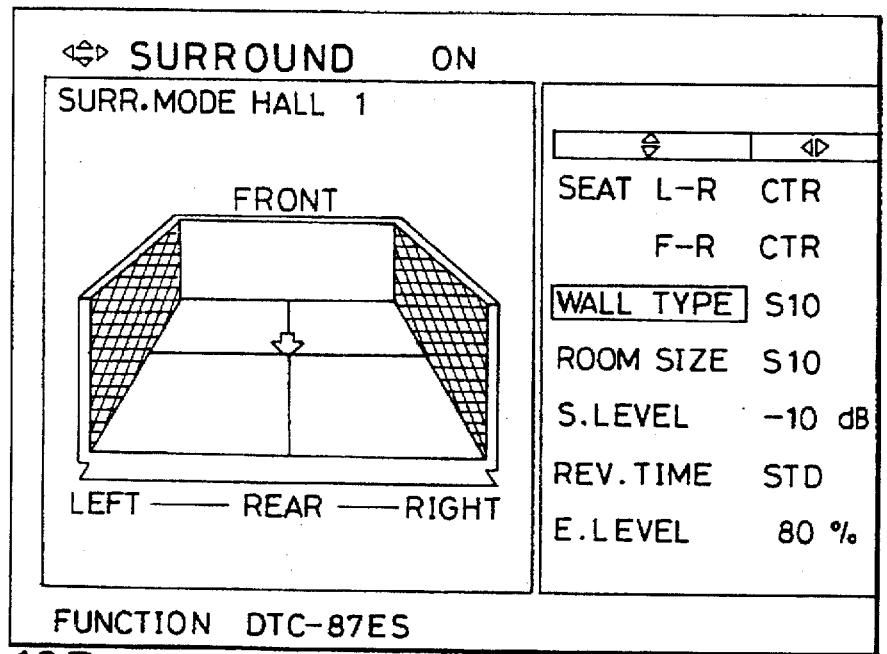
FIGS. 18A and 18B are views illustrative of a further example of operation display process.
Figure 18B:
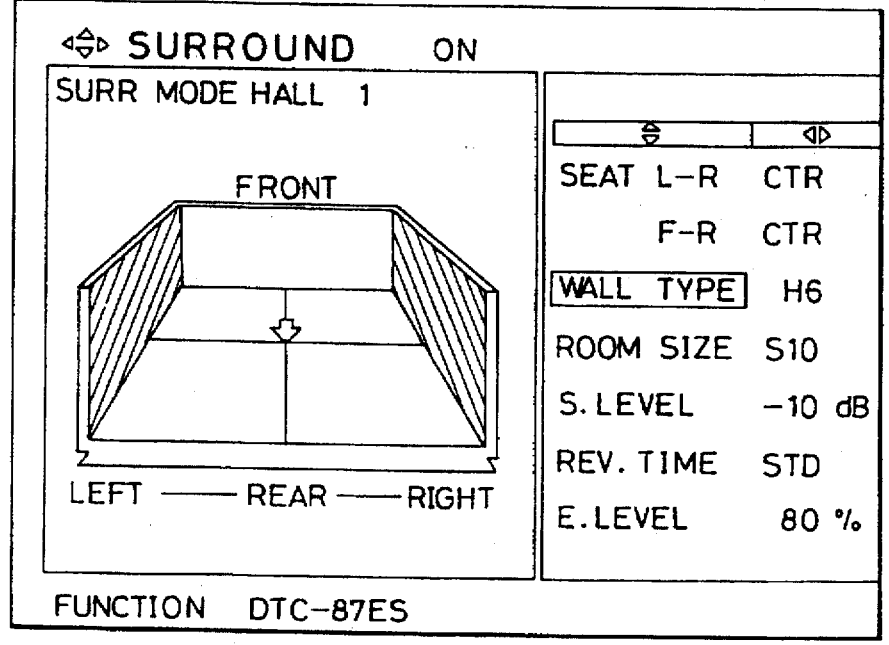

Then, the operation keys 33c, 33d are operated to modify the parameter indicative of the material of a wall surface, thus varying the image as shown in FIG. 18A or 18B. FIGS. 18A and 18B illustrate the shape of a sound field. As the operation keys 33c, 33d are operated, the color of an image portion corresponding to the wall surface is varied. More specifically, the ratio of mixture of red (R), green (G), and blue (B) of the displayed color in the image portion is varied as indicated in the table of FIG. 19. According to the table of FIG. 19, the colors of materials in upper rows (softer materials) are indicated as warmer colors, and the colors of materials in lower rows (harder materials) are indicated as colder colors.

The parameter indicative of the material of a wall surface corresponds to a change in the frequency characteristic (filter) with respect to initial reflected sounds and reverberation as shown in FIGS. 20A and 20B. Since the representations of FIGS. 20A and 20B are difficult to understand, the material of a wall surface is displayed as a change in the color of an image portion corresponding to the wall surface as shown in FIGS. 18A and 18B for an easier visual recognition of the wall material.

The audio equipment thus clearly displays an image representing the shape of a standard sound field, with the color of an image portion which corresponds to a wall surface being varied as the parameter indicative of the material of the wall surface is varied.

Figure 21:
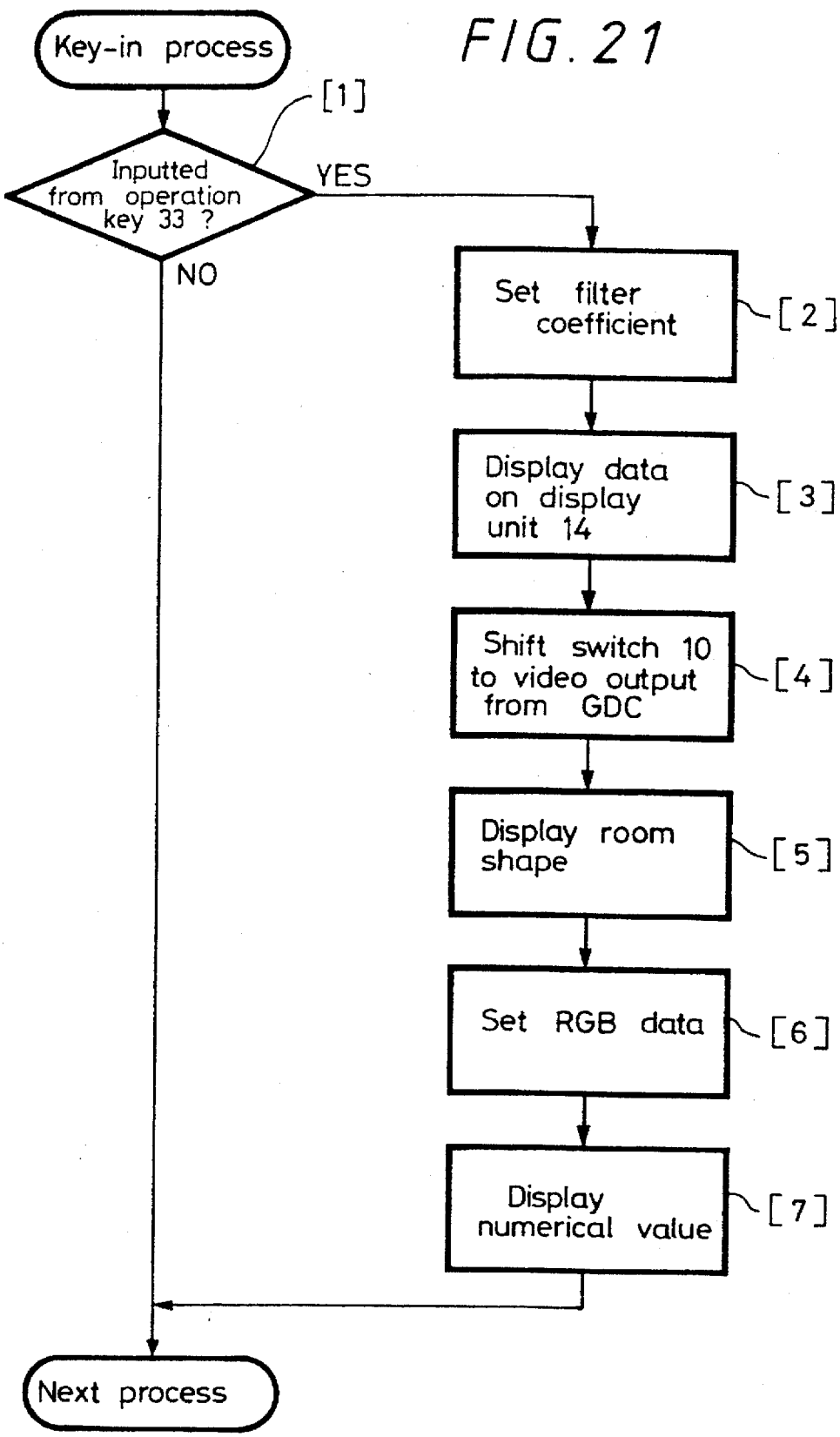
FIG. 21 is a flowchart illustrative of the parameter of a wall surface material.

FIG. 21 shows a flowchart of a key-in process for the above operation display process. When the key-in process is started, a step [1] determines whether the operation keys 33 are operated or not. If NO, control proceeds to a next process. If YES, filter coefficient data stored in the RAM 23 is read and set in the DSP unit 4 in a step [2]. The data is then displayed on the display unit 14 in a step [3], and the switch 10 is shifted to the GDC 9 in a step [4].

A step [5] supplies display data of the shape of a sound field to the GDC 9, and a step [6] supplies color data (RGB) of the material of a wall surface of the set sound field to draw on an image portion corresponding to the wall surface. After numerical display data is supplied in a step [7], control goes to the next process.

The above display can therefore be carried out in the manner described above.

Figure 22A:
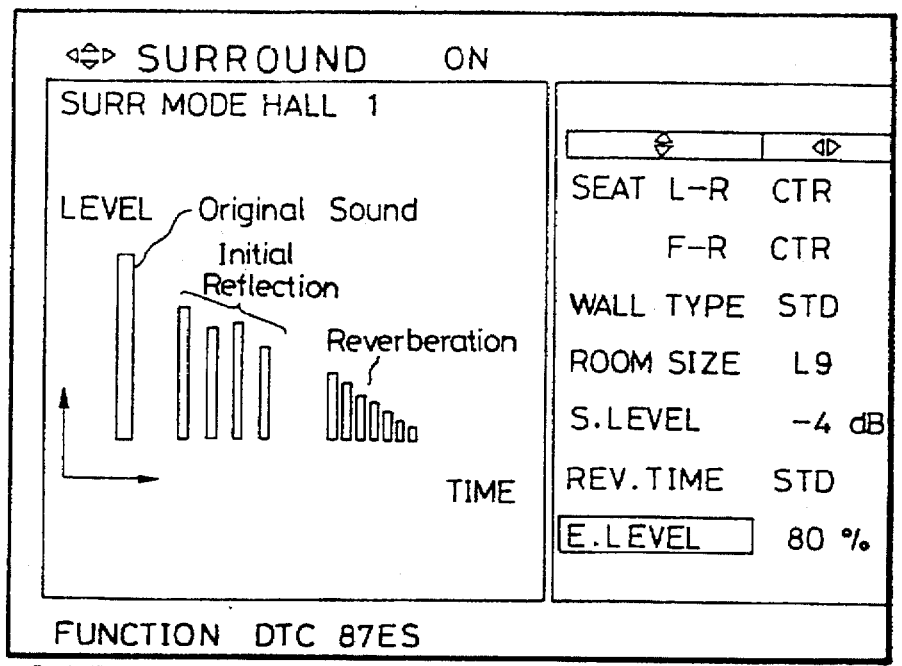
FIGS. 22A and 22B are views illustrative of a still further example of operation display process.
Figure 22B:
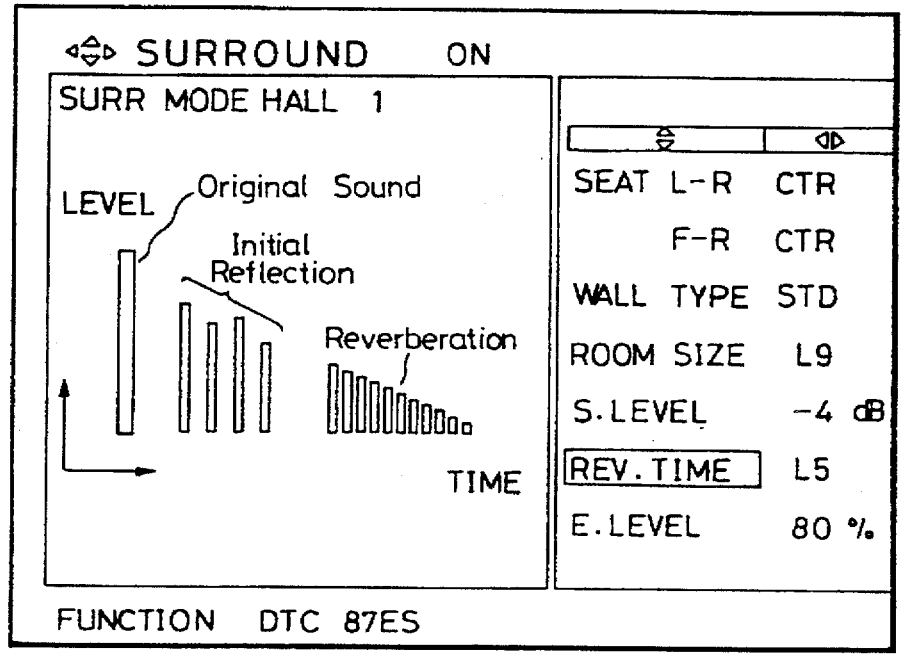

To set the parameter of the position of a seat, the position of the arrow shown in FIGS. 18A and 18B is moved forward, backward, leftward, or rightward. To set the parameter of the level of a surround effect, images representing original sound, initial reflection, and reverberation are displayed as shown in FIG. 22A, and the heights of the graphs indicating initial reflection and reverberation are varied. To set the parameter of the duration of reverberation, images representing original sound, initial reflection, and reverberation are displayed as shown in FIG. 22B, and the height of the graph indicating reverberation is varied. Therefore, these displays can clearly be produced.

Figure 23A:
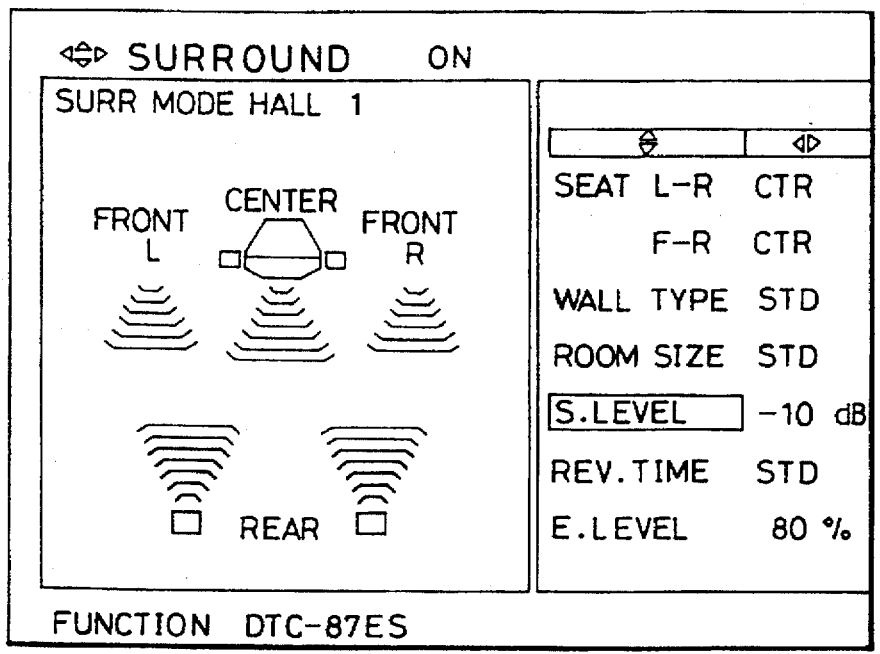
FIGS. 23A and 23B are views illustrative of a yet further example of operation display process.
Figure 23B:
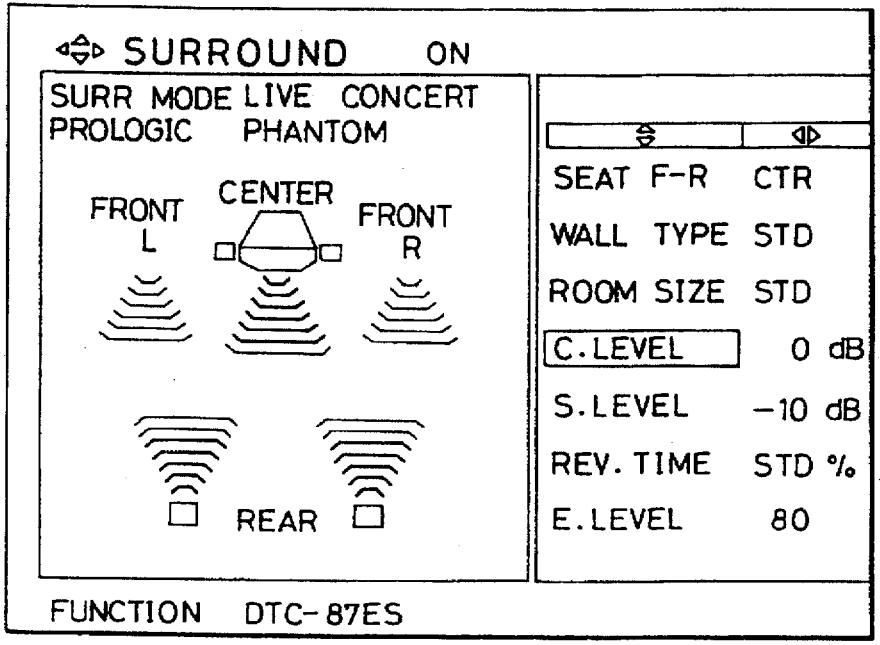

FIGS. 23A and 23B show display images for setting sound levels. FIG. 23A illustrates a surround level, and FIG. 23B illustrates a center level, both through the number of thick lines. In this manner, the sound levels can clearly be displayed.

We claim:

1. A method of displaying operation of an audio equipment in a room in which an user is situated, comprising the steps of:

producing an image signal to display an image indicative of a sound field;

detecting a setting of a parameter of a material of a wall surface around the sound field, the parameter of the material of the wall surface around the sound field being desirably set according to an actual material of a wall surface in the room; and varying a portion of the image corresponding to the wall surface around the sound field in accordance with the setting of the parameter of the material of the wall surface around the sound field, wherein the setting of the parameter of the material of the wall surface around the sound field is visually confirmed by the corresponding varying portion of the image.

2. A method of displaying operation of an audio equipment in a room in which a user is situated, comprising the steps of:

varying acoustic characteristics corresponding to a setting of a sound field in accordance with operation of an operation unit by the user;

producing an image signal to display an image corresponding to the set sound field; and varying a portion of the displayed image corresponding to a wall material around the sound field in accordance with a parameter setting of a material of the wall surface around the sound field, the parameter of the material of the wall surface around the sound field being desirably set according to an actual material of a wall surface in the room, wherein the setting of the parameter of the material of the parameter of the wall surface around the sound field is visually confirmed by the corresponding portion of the displayed image.

* * * * *